United States Patent [19]
Ando et al.

[11] Patent Number: 5,432,766
[45] Date of Patent: Jul. 11, 1995

[54] CIRCUIT FOR VARYING A LOOP GAIN OF A SPINDLE SERVO

[75] Inventors: Ryo Ando; Kazuhiko Fujiie, both of Tokyo, Japan

[73] Assignee: Sony Corporation, Tokyo, Japan

[21] Appl. No.: 316,812

[22] Filed: Oct. 3, 1994

Related U.S. Application Data

[63] Continuation of Ser. No. 63,462, May 18, 1993, abandoned.

[30] Foreign Application Priority Data

May 22, 1992 [JP] Japan ................. 4-130986

[51] Int. Cl.⁶ ............................................. G11B 17/00
[52] U.S. Cl. ............................. 369/47; 369/50; 360/73.03
[58] Field of Search ............... 369/50, 47, 54, 48, 369/58, 53; 360/73.01, 73.02, 73.03

[56] References Cited

U.S. PATENT DOCUMENTS

| | | | |
|---|---|---|---|
| 4,338,683 | 7/1982 | Furukawa et al. | 369/50 |
| 4,575,835 | 3/1986 | Nishikawa et al. | 369/50 |
| 4,723,295 | 2/1988 | Kosaka et al. | 369/50 |
| 4,783,774 | 11/1988 | Enomoto | 369/50 |
| 4,864,428 | 9/1989 | Kanamaru | 360/73.03 |
| 4,908,810 | 3/1990 | Oie | 369/50 |
| 5,170,386 | 12/1992 | tateishi | 369/50 |
| 5,265,081 | 11/1993 | Shimizume et al. | 360/73.03 |
| 5,289,451 | 2/1994 | Ashinuma et al. | 369/47 |

FOREIGN PATENT DOCUMENTS

0525809A2 7/1992 European Pat. Off. ....... H04B 1/66

OTHER PUBLICATIONS

Globecom '90, vol. 1, Dec. 1990, NY pp. 518–522, Mahieux et al 'Transform Coding of Audio Signals at 64 Kbits/s' *abstract*, *p. 520, left column, line 61–p. 521, left column, line 7–line 18.

EBU Review-Technical, No. 230, Aug. 1988, Brussels BE pp. 158–181, Theile et al 'LOW bit-rate coding of high-quality audio signals An introduction to the MASCAM system', *p. 162, left column, line 17–p. 164, left column, line 2; FIGS. 4,5*.

*Primary Examiner*—Georgia Y. Epps
*Assistant Examiner*—P. W. Huber
*Attorney, Agent, or Firm*—Limbach & Limbach

[57] ABSTRACT

In a spindle servo circuit for controlling rotation of a disc, a loop gain of a spindle servo can be varied and a reproduced synchronizing signal from the disc and a reference signal are compared with each other. A phase difference signal and a frequency difference signal that are compared results are chopped by a chopper clock. A loop gain of a servo circuit is varied by varying a duty ratio of the chopper clock and the loop gain can be varied by controlling the duty ratio of the chopper clock in response to a radius of the disc or a revolution rate of the disc.

10 Claims, 5 Drawing Sheets

FIG. 2

| Count Values of Counter 21 MSB      LSB | | | Outputs at Fixed Contacts of Switch 22 | | |
|---|---|---|---|---|---|
| $Q_C$ | $Q_B$ | $Q_A$ | 22d | 22c | 22b |
| 0 | 0 | 0 | 0 | 0 | 0 |
| 0 | 0 | 1 | 0 | 0 | 0 |
| 0 | 1 | 0 | 0 | 0 | 0 |
| 0 | 1 | 1 | 0 | 0 | 0 |
| 1 | 0 | 0 | 0 | 0 | 1 |
| 1 | 0 | 1 | 0 | 0 | 1 |
| 1 | 1 | 0 | 0 | 1 | 1 |
| 1 | 1 | 1 | 1 | 1 | 1 |

CIRCUIT FOR VARYING A LOOP GAIN OF A SPINDLE SERVO

This is a continuation of application Ser. No. 08/063,462, filed on May 18, 1993, now abandoned.

BACKGROUND OF THE INVENTION

1. Field of the Invention

The present invention relates to a spindle servo circuit of a disc drive apparatus for use in an optical disc reproducing apparatus or the like.

2. Description of the Prior Art

Optical disc and magneto-optical disc recording and reproducing apparatus are known to optically read out recorded data from optical discs and magneto-optical discs. One of such optical discs is generally known as a compact disc (hereinafter simply referred to as a CD).

A spindle servo mechanism that rotates the CD, for example, is controlled to rotate the CD at a constant linear velocity. A linear velocity of the CD is determined in a range of from 1.2 to 1.4 m/s. A revolution rate of the 12-cm CD is about 500 r.p.m. in the inner periphery. This revolution rate, i.e., about 500 r.p.m. is changed to about 200 r.p.m. in the outer periphery of the 12-cm CD. Therefore, a loop gain of a spindle servo is changed in response to the change of revolution rate of the CD from its inner periphery to its outer periphery. Generally, in the 12-cm CD, a loop gain in the inner periphery is lower than that in the outer periphery by about 8 dB.

In addition to the 12-cm CDs, 8-cm CDs are now commercially available on the market. The 8-cm CD has a mass smaller than that of the 12-cm CD and therefore a moment inertia thereof is changed. It is generally known that a loop gain is changed with a difference of a moment of inertia. If the reproducing positions in the radial direction of the 12-cm CD and 8-cm CD are the same and the revolution rates at that reproducing position are the same in the 12-cm CD and 8-cm CD, then the difference of loop gain depends upon a mass ratio.

According to the standardization of CDs, the mass of 12-cm CD falls in a range of from 14 to 33 g and that of 8-cm CD falls in a range of from 6 to 16 g. A difference of loop gain with the same revolution number (=the same reproducing portion) fluctuations in a range of 1 to 14 (dB).

As is clear from the foregoing explanation, the servo gain is changed depending on the diameter of the disc to be rotated or a rotating frequency of the disc. U.S. Pat. No. 5,170,386 describes a method in which a spindle servo loop gain that changes in association with the change of linear velocity is constantly kept at constant loop gain regardless of the change of linear velocity. Japanese laid-open patent publication No. 4-245061 describes a method in which the type of disc is identified on the basis of a subcode recorded on a CD thereby to vary a servo loop gain.

Further, as a method of varying a servo loop gain, it is proposed to vary a gain of a driver circuit or to vary a frequency of a comparing signal and a reference signal of a servo control comparator. One well-known method of varying a gain of the driver circuit is to vary an input resistance or feedback resistance of an operational amplifier.

Furthermore, a loop gain of spindle servo in a CD signal processing IC (integrated circuit), which is manufactured by Sony Corporation under the trade name of CXD-2500, is varied as follows.

A signal that is recorded on a disc in advance is reproduced by an optical pickup. This reproduced signal is supplied to the above-mentioned signal processing IC, in which it is demodulated to provide an EFM (eight-to-fourteen modulation) signal. Then, a reproducing synchronizing signal included in the EFM signal at a predetermined interval is extracted by a reproducing synchronizing signal extracting circuit. The reproducing synchronizing signal thus extracted is frequency-divided by a frequency divider. The frequency-divided signal is supplied to a frequency comparator and a phase comparator as a comparing signal.

The frequency comparator and the phase comparator are supplied with a reference signal generated by a clock circuit formed of a crystal oscillator and compare a frequency difference and a phase difference between the reference signal and the comparing signal. Then, the frequency difference and the phase difference are measured by the counter and the gains of the frequency difference and the phase difference are varied by varying measured values.

As another means for varying a servo gain, there is known a method in which a servo gain is varied by varying a comparing signal frequency and a reference signal frequency of a servo control comparator. To be more concrete, a frequency-dividing ratio of a frequency divider is varied and also the reference signal is varied with the same ratio as the frequency-dividing ratio within a clock circuit, thereby varying the gain.

When the servo gain is varied by changing the gain of a driver circuit, a gain of an analog amplifier must be varied. There is then the disadvantage that a circuit arrangement thereof becomes complicated.

Furthermore, when the gain is varied by varying the comparing signal frequency and the reference signal frequency of the servo control comparator, a cut-off frequency of a low-pass filter that constructs a servo loop must be switched in a ganged relation to the change of the comparing frequency. As a result, a circuit arrangement for switching the comparing frequency becomes complicated.

OBJECTS AND SUMMARY OF THE INVENTION

Therefore, it is an object of the present invention to provide an improved spindle servo circuit in which the aforesaid shortcomings and disadvantages of the prior art can be eliminated.

More specifically, it is an object of the present invention to provide a spindle servo circuit of a simple arrangement which can vary a servo gain.

It is another object of the present invention to provide a spindle servo circuit in which a servo loop gain can be varied in response to various control commands.

According to an aspect of the present invention, there is provided a spindle servo circuit which servo-controls a spindle motor that rotates a disc. This spindle servo circuit comprises a comparing circuit for comparing frequencies and phases of a synchronizing signal detected from a reproduced signal from the disc and a reference signal, a chopper clock generating circuit, a chopper circuit for chopping an output of the comparing circuit by a chopper clock and a driver circuit for controlling rotation of the spindle motor on the basis of a chopped output, wherein a gain of a servo circuit is varied by varying a duty ratio of the chopper clock.

Further, the spindle servo circuit further includes a disc type detector circuit, in which the duty ratio of the chopper clock is varied in response to an output of the disc type detector circuit.

Furthermore, the spindle servo circuit further includes a reproducing position detector circuit for detecting a reproducing position of a disc in the radial direction, in which the duty ratio of the chopper clock is varied in response to an output of the reproducing position detector circuit.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which:

FIG. 2 is a transition table of a counter and gate circuits, and to which references will be made in explaining the embodiment of the present invention;

DETAILED DESCRIPTION OF THE PREFERRED EMBODIMENT

The present invention will now be described in detail with reference to the drawings.

Figure 1:
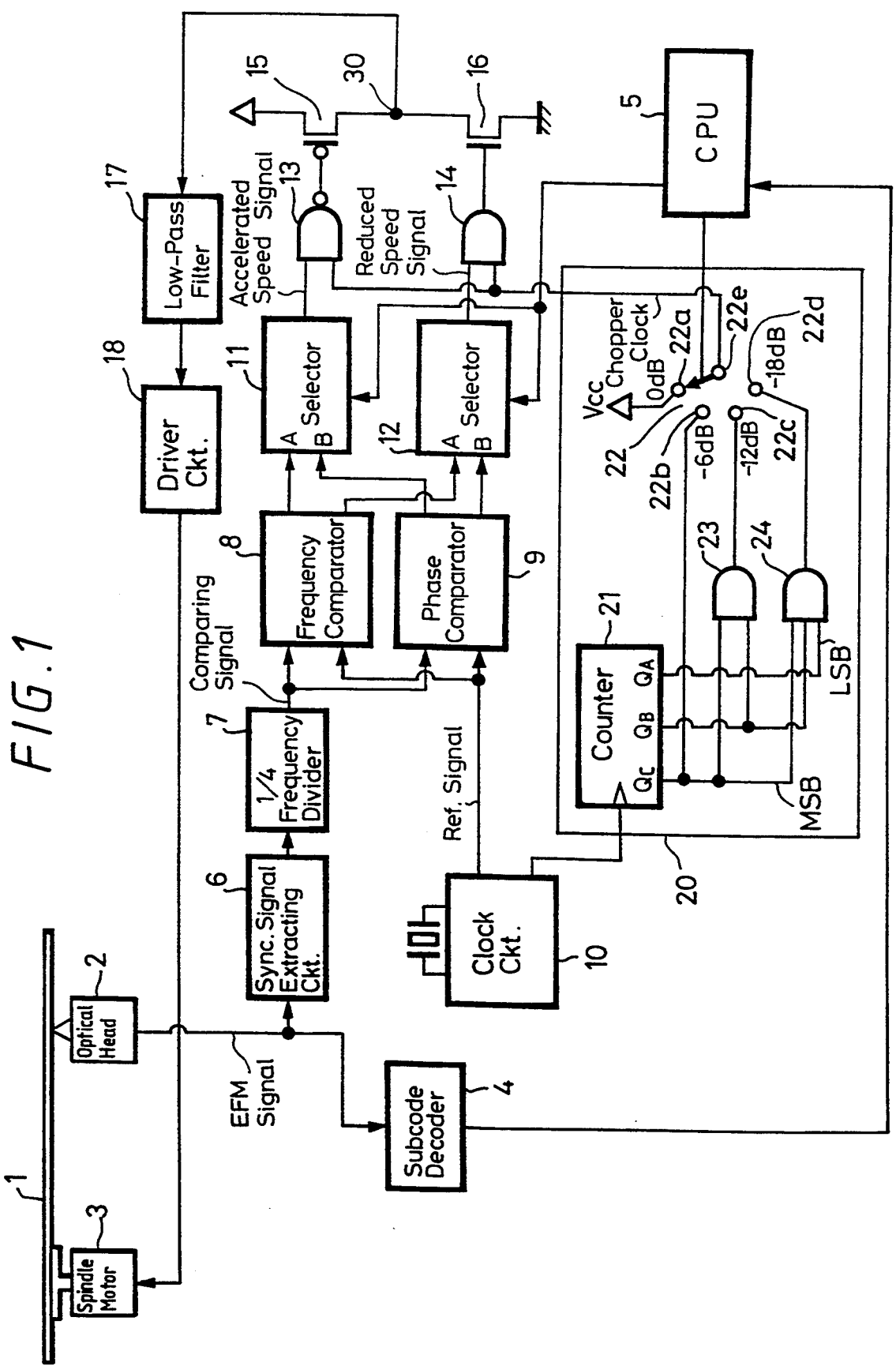
FIG. 1 is a block diagram showing a circuit arrangement of a spindle servo circuit according to an embodiment of the present invention.

FIG. 1 of the accompanying drawings shows in block form a circuit arrangement of a spindle servo circuit according to an embodiment of the present invention which is applied to an optical disc reproducing apparatus. As shown in FIG. 1, there is provided an optical disc 1, from which there is read out recorded data by an optical head 2. The optical disc 1 is rotated by a spindle motor 3 that is rotated under the control of a driver circuit 18 that will be described later on.

A signal read out from the optical disc 1 by the optical head 2 is an eight-to-fourteen modulation (EFM) signal that is used in the digital data recording of CD or the like. The EFM signal is supplied to a predetermined reproducing system circuit (not shown) which then effects data reproducing processing. The EFM signal is supplied to a subcode decoder 4 which then decodes a subcode such as address data or the like. Decoded data is supplied to a central processing unit (CPU) 5.

The reproduced EFM signal is supplied to a servo control circuit that will be described below. More specifically, the EFM signal read out from the optical disc 1 by the optical head 2 is supplied to a sync. (synchronizing) signal extracting circuit 6. The sync signal extracting circuit 6 extracts a sync signal that is included in a recording signal at a predetermined interval. A sync signal thus extracted is frequency-divided by a ¼-frequency divider 7. A frequency-divided signal is supplied to a frequency comparator 8 and a phase comparator 9 as a comparing signal. The frequency comparator 8 and the phase comparator 9 are supplied with a reference signal from a clock circuit 10 and compare a frequency difference and a phase difference between the reference signal and the comparing signal, respectively. Compared outputs of the frequency comparator 8 and the phase comparator 9 are supplied to selectors 11, 12. The selectors 11, 12 are adapted to select the compared outputs of any of the comparators 8, 9 in response to a selection signal supplied thereto from the CPU 5. The compared output selected by the selector 11 is supplied to one input end of a NAND circuit 13 as an accelerated speed signal, and the compared output selected by the selector 12 is supplied to one input end of an AND gate 14 as a reduced speed signal.

A clock having a frequency higher than the reference signal frequency generated from the clock circuit 10 is supplied to a chopper clock circuit 20. In the chopper clock circuit 20, the clock from the clock circuit 10 is supplied to a counter 21 which derives 3-bit count values $Q_A$, $Q_B$ and $Q_C$. In this case, $Q_A$ is an LSB (least significant bit) and $Q_C$ is an MSB (most significant bit). The count values $Q_A$, $Q_B$, $Q_C$ are supplied to a changeover switch 22 which includes first to fourth fixed contacts 22a to 22d and a movable contact 22e. The count value $Q_C$ is supplied to the second fixed contact 22b. An ANDed output of the count values $Q_B$ and $Q_C$ by an AND gate 23 is supplied to the third fixed contact 22c. An ANDed output of the count values $Q_A$, $Q_B$, $Q_C$ by an AND gate 24 is supplied to the fourth fixed contact 22d. A power supply source voltage is applied to the first fixed contact 22a.

Figure 3:
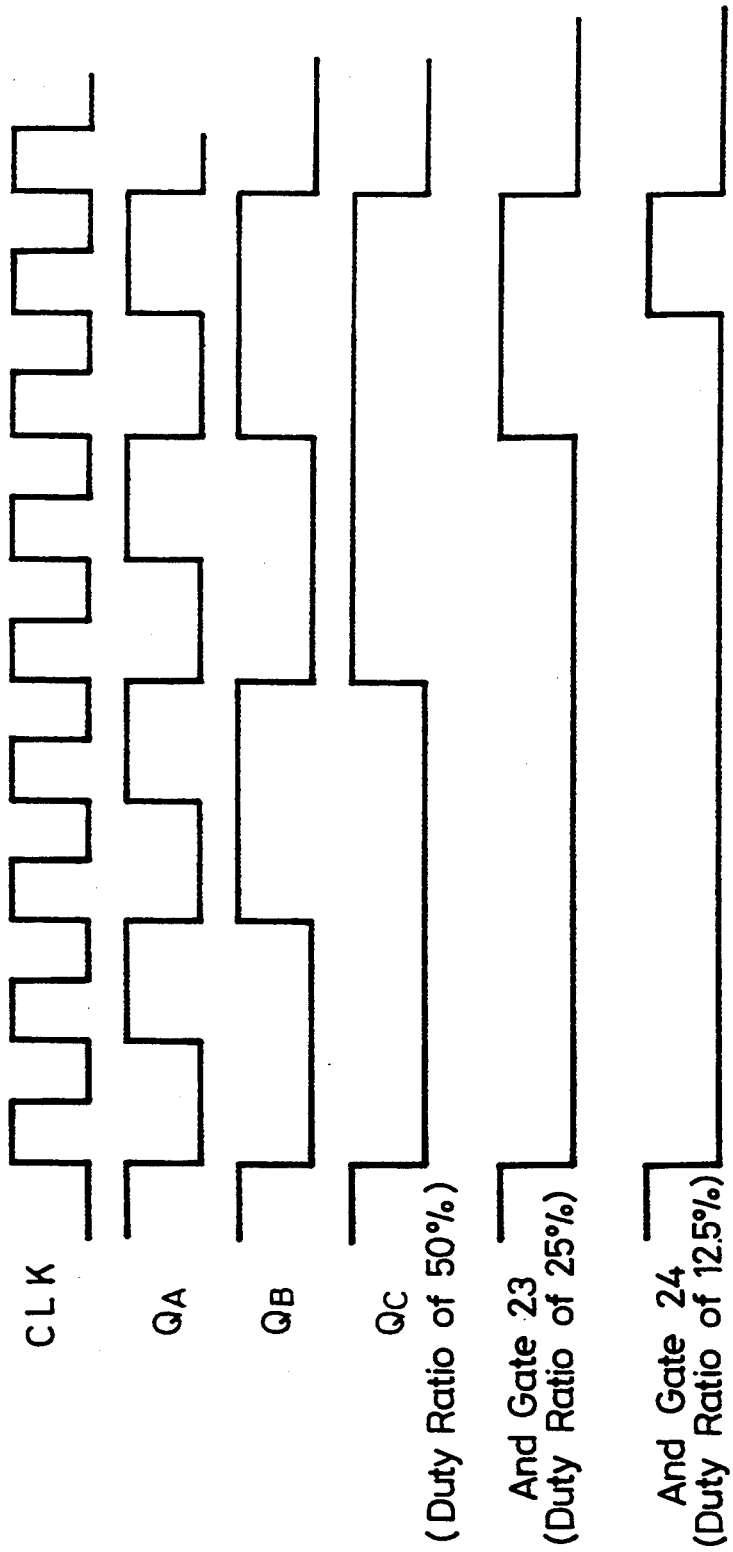
FIG. 3 is a timing chart used to explain the embodiment of the present invention.

When the clock generated from the clock circuit 10 is supplied to the counter 21, respective gate outputs are in accordance with the output form shown in a transition table of FIG. 2. The counter 21 is a modulo counter. FIG. 3 is a timing chart illustrative of the clock, the outputs $Q_A$, $Q_B$, $Q_C$ of the counter 21 and the outputs of the AND gates 23, 24. Study of FIG. 3 reveals that a pulse of duty ratio of 50% is developed at the second fixed contact 22b of the switch 22, a pulse of duty ratio of 25% is developed at the third fixed contact 22c and a pulse of duty ratio of 12.5% is developed at the fourth fixed contact 22d.

The change-over switch 22 is changed in position under the control of the CPU 5. That is, when the servo gain is 0 dB, the change-over switch 22 connects its movable contact 22e to the first fixed contact 22a under the control of the CPU 5. When the servo gain is −6 dB, the change-over switch 22 connects its movable contact 22e to the second fixed contact 22b under the control of the CPU 5. When the servo gain is −12 dB, the change-over switch 22 connects its movable contact 22e to the third fixed contact 22c under the control of the CPU 5. When the servo gain is −18 dB, the change-over switch 22 connects its movable contact 22e to the fourth fixed contact 22d under the control of the CPU 5.

A signal developed at the movable contact 22e of the change-over switch 22 is supplied to the other input end of the NAND gate 13 and the other input end of AND gate 14 as the chopper clock. A logical output from the NAND gate 13 is supplied to the gate of a P-channel MOS (metal oxide semiconductor) transistor 15, and a logical output from the AND gate 14 is supplied to the gate of an N-channel MOS transistor 16. Source-drain paths of the two transistors 15, 16 are connected and a signal developed at a junction 30 is supplied through a low-pass filter 17 to a driver circuit 18. Therefore, the driver circuit 18 actuates the spindle motor 3 by a control signal that is a signal supplied from the two transistors 15, 16 side.

The control circuit that controls the spindle motor 3 is arranged as described above. Thus, when the selector 11 outputs the accelerated speed signal, the revolution rate of the spindle motor 3 is increased. When the selector 12 outputs the reduced speed signal, the revolution rate of the spindle motor 3 is decreased. Accordingly, a servo loop that stabilizes the speed of the spindle motor 3 to a predetermined speed is arranged so that the sync signal is reproduced to have a frequency corresponding to the reference frequency.

In this embodiment, the accelerated speed signal and the reduced speed signal output from the two selectors 11, 12 are supplied to the NAND gate 13 and the AND gate 14, in which they are ANDed with the chopper clock to effect the chopper processing of the accelerated speed signal and the reduced speed signal in accordance with the chopper clock. Thus, the gains of the accelerated speed signal and the reduced speed signal supplied to the driver circuit 18 side are changed and hence the servo gain is changed.

Figure 4:
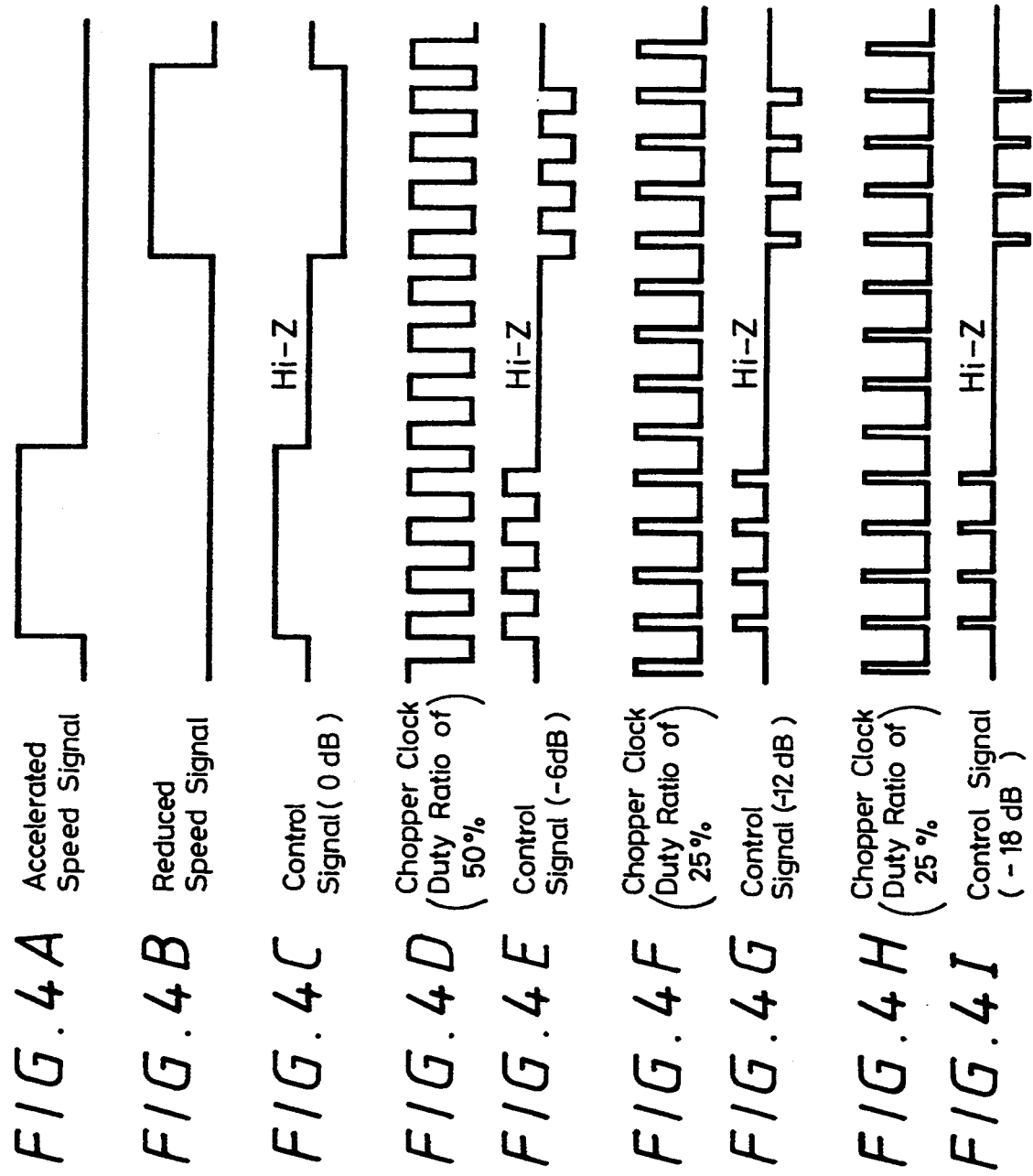
FIGS. 4A through 4I are respectively timing charts of a chopper clock generating means, and to which references will be made in explaining the embodiment of the present invention.

The change of the servo gain will be described with reference to timing charts of FIGS. 4A through 4I. Let it now be assumed that an accelerated speed signal shown in FIG. 4A and a reduced speed signal shown in FIG. 4B are obtained at a certain timing. At that time, when the change-over switch 22 connects its movable contact 22e to the first fixed contact 22a under the control of the CPU 5 (i.e., servo gain is set to 0 dB), a signal which is constantly held at high level is obtained as the chopper clock, and a signal (see FIG. 4C) that results from mixing the accelerated speed signal and the reduced speed signal is supplied to the driver circuit 18 side as a control signal. The control signal is fixed to high impedance (Hi-Z) during a period in which the accelerated speed signal and the reduced speed signal are both at low level, because the transistors 15, 16 are both in the off-state.

When the servo gain is set to −6 dB, the change-over switch 22 connects its movable contact 22e to the second fixed contact 22b under the control of the CPU 5 so that a chopper clock having a duty ratio of 50% (see FIG. 4D) developed at the second fixed contact 22b is supplied to the NAND gate 14 and the AND gate 13. Accordingly, the NAND circuit 13 and the AND gate 13 effect logical calculation to output the accelerated speed signal and the reduced speed signal only during a period in which the chopper clock is at high level. The control signal supplied to the driver circuit 18 side at that time is chopped with a duty ratio corresponding to the chopper clock during other period than the period during which the control signal of gain 0 dB is at high impedance (Hi-Z). The control signal whose duty ratio is chopped to the duty ratio of 50% as described above is supplied to the driver circuit 18, whereby the average voltage of the control signal is lowered. Thus, the spindle motor 3 is controlled with gain that is lowered by 6 dB.

Similarly, when the servo gain is set to −12 dB or −18 dB, the change-over switch 22 connects its movable contact 22e to the third or fourth fixed contacts 22c, 22d, whereby a chopper clock having a duty ratio of 25% or 12.5% (see FIGS. 4F, 4H) developed at the third or fourth fixed contacts 22c, 22d is supplied to the NAND gate 13 and the AND gate 14. Then, the NAND gate 13 and the AND gate 14 effect corresponding logical calculations thereby to supply a control signal whose duty ratio is chopped to 25% or 12.5% to the driver circuit 18. Thus, the spindle motor 3 is controlled with a gain that is lowered by 12 dB or 18 dB.

As described above, the loop gain of the spindle servo circuit can be changed in four grades of 0 dB, −6 dB, −12 dB and −18 dB by changing the change-over switch 22 in position under the control of the CPU 5. Therefore, proper gains can be set depending on the type of the disc 1 to be loaded or the like and a satisfactory spindle servo becomes possible constantly. In this case, according to this embodiment since the control signal supplied to the spindle motor driver circuit 18 is chopped by clocks having different duty ratios, the chopper clocks having different duty ratios can be formed with ease by digital circuits such as the counter, the gate circuits or the like. Therefore, the gain of amplifier, a characteristic of low-pass filter, etc., need not be varied unlike the prior art. Hence, the spindle servo circuit of the present invention can be simplified in circuit arrangement.

A judgement done by the CPU in order to switch the gain of the servo loop will be described below. By way of example, the gain of the servo loop is switched on the basis of the type (size) of the loaded disc judged by the CPU 5 on the basis of subcode decoded by the subcode decoder 4. According to this proposal, a so-called multi-disc player in which plural kinds of discs can be loaded onto and played by a single reproducing apparatus can be realized by a simple spindle servo system. If the spindle servo circuit of this embodiment is applied to the type of reproducing apparatus that can play only one kind of disc, then the circuit of the spindle servo system of this reproducing apparatus can also serve as that of reproducing apparatus which plays other kinds of discs. Therefore, a general purpose property of the spindle servo circuit can be improved.

While the gain of the servo loop is switched depending on the type of disc as described above, the present invention is not limited thereto. That is, when one disc is reproduced, the gain of servo loop may be switched during reproduction. By way of example, the gain of servo loop may be switched on the basis of reproducing (or recording) conditions such as when the inner peripheral side of the disc is reproduced (or recorded) and when the outer peripheral side of the disc is reproduced (or recorded). This switching operation of the servo loop gain will be described with reference to a flowchart forming FIG. 5.

Figure 5:
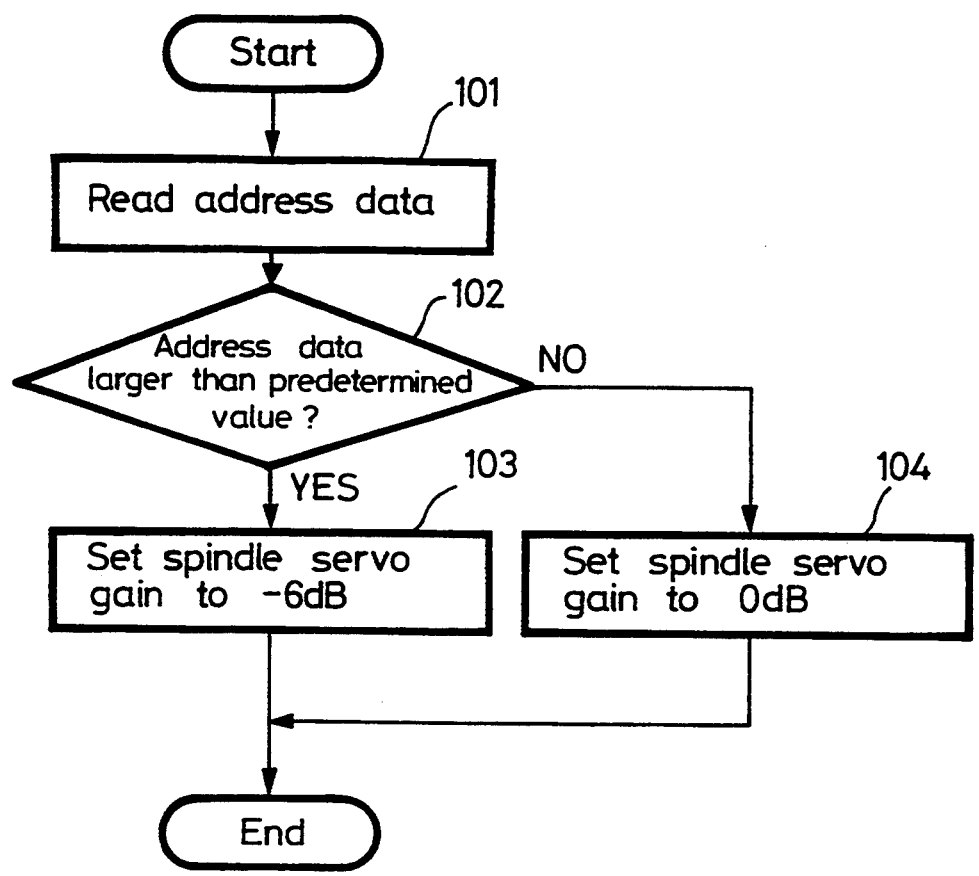
FIG. 5 is a flowchart to which references will be made in explaining the embodiment of the present invention.

Referring to FIG. 5, following the start of operation, address data decoded by the subcode decoder 4 is read out by the CPU 5 in step 101. It is determined in the next decision step 102 by the CPU 5 whether or not the address data thus read is larger than a predetermined value. If the address data is larger than the predetermined value as represented by a YES at decision step 102, then the processing proceeds to step 103, whereat the gain is set to −6 dB. If on the other hand the address data is smaller than the predetermined value as represented by a NO at decision step 103, then the processing proceeds to step 104, whereat the gain is set to 0 dB. The gain is switched depending on the inner or outer periphery of the disc as described above, thereby properly adjusting the gains so that the gains become suitable for respective reproducing positions (respective recording positions). The switching of the gains in the inner and outer peripheries of the disc is suitably applied to the case that the disc rotation is controlled in a constant linear velocity (CLV) fashion when the rotation speed of the disc becomes different in the inner and outer peripheries of the disc.

There has been developed a reproducing apparatus which is capable of a so-called high speed dubbing in which audio data recorded on a disc is reproduced at high speed (twice the normal speed) and the data thus reproduced at high speed is recorded by a tape recorder at high speed. In such case, the disc must be rotated at higher speed than the normal speed. At that time, if the spindle servo circuit of this embodiment is applied to the above reproducing apparatus thereby to switch the gain, then a satisfactory spindle servo can be carried out with ease.

In the case of a reproducing apparatus arranged so that audio data read out from the disc is temporarily stored in a memory and then stably read out from the memory without interruption, audio data must be read out at speed slightly higher than the normal a speed in order that audio data is written in the memory with enough time. In that case, the loop gain may be changed by the spindle servo circuit of this embodiment when the rotation speed of the spindle motor is fluctuated.

Further, the servo gain of the spindle motor may be switched by the spindle servo circuit of this embodiment because of other causes.

While the servo gain is varied in four grades of 0 dB, −6 dB, −12 dB and −18 dB as described above, the present invention is not limited thereto and the servo gain may be varied in more small grades or may be varied in about two grades. In any case, since the chopper pulse of the corresponding duty ratio is formed by the combination of the counter and the gate circuits, a chopper pulse having a desired duty ratio can be obtained with ease.

According to the present invention, the gain of the spindle servo circuit can be varied with ease by digitally controlling a duty ratio of a clock pulse. Therefore, the switching of the servo gain associated with the type of disc and the recording and reproducing states can be realized with ease.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A disc reproducing apparatus comprising:
   (a) means for reading out information recorded on a disc;
   (b) synchronizing signal detecting means for detecting a synchronizing signal from a reproduced signal obtained from said means for reading out information recorded on the disc;
   (c) reference signal generating means for generating a reference signal;
   (d) first comparing means for comparing a frequency of said detected synchronizing signal and a frequency of said reference signal;
   (e) second comparing means for comparing a phase of said detected synchronizing signal and a phase of said reference signal;
   (f) means for generating a chopper clock signal for controlling an output signal from said first and second comparing means;
   (g) means for controlling output signals from said first and second comparing means by varying a duty ratio of said chopper clock signal; and
   (h) a spindle motor for rotating said disc, wherein a speed of rotation of said motor is responsive to an output of said means for controlling said output signals from said first and second comparing means.

2. The disc reproducing apparatus of claim 1, further comprising:
   control means for controlling said means for generating said chopper clock signal, wherein said control means controls a width of a drive voltage of said spindle motor by varying a duty ratio of said chopper clock signal.

3. The disc reproducing apparatus of claim 2, wherein said means for generating a chopper clock signal further comprises:
   a counter supplied with a clock from said reference signal generating means to count said clock;
   means for generating a plurality of chopper clock signals having variable duty ratios from an output of said counter; and
   switching means for selecting amongst a plurality of chopper clocks having variable duty ratios.

4. The disc reproducing apparatus of claim 3, wherein said control means switches said switching means.

5. The disc reproducing apparatus of claim 1, wherein a frequency of a clock pulse supplied to said means for generating a chopper clock signal is higher than the frequency of said reference signal generated from said reference signal generating means.

6. The disc reproducing apparatus of claim 3, wherein said control means for controlling said means for generating a chopper clock signal controls said switching means in response to data that is recorded on said disc.

7. The disc reproducing apparatus of claim 6, wherein said data that is recorded on said disc is subcode data.

8. The disc reproducing apparatus of claim 2, further comprising:
   disc type detecting means for outputting a signal corresponding to a type of disc mounted on said disc reproducing apparatus, wherein the type of disc determines a speed at which the disc should be rotated by said spindle motor, and further, wherein said control means for controlling said means for generating a chopper clock signal controls said switching means in response to an output from said disc type detecting means.

9. The disc reproducing apparatus of claim 8, wherein said disc type detecting means detects the disc type by identifying said subcode data recorded on said disc.

10. The disc reproducing apparatus of claim 3, wherein said control means for controlling said chopper clock generating means controls said switching means in a high speed playback mode.

* * * * *